(12) United States Patent
Fujino et al.

(10) Patent No.: US 11,582,320 B2
(45) Date of Patent: Feb. 14, 2023

(54) MESSAGE TRANSMITTING AND RECEIVING METHOD, COMMUNICATION APPARATUS, AND PROGRAM

(71) Applicant: NIPPON TELEGRAPH AND TELEPHONE CORPORATION, Tokyo (JP)

(72) Inventors: Tomoyuki Fujino, Musashino (JP); Yui Saito, Musashino (JP); Keiichiro Kashiwagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/421,106

(22) PCT Filed: Nov. 29, 2019

(86) PCT No.: PCT/JP2019/046760
§ 371 (c)(1),
(2) Date: Jul. 7, 2021

(87) PCT Pub. No.: WO2020/158154
PCT Pub. Date: Aug. 6, 2020

(65) Prior Publication Data
US 2022/0103649 A1 Mar. 31, 2022

(30) Foreign Application Priority Data
Jan. 28, 2019 (JP) ............................. JP2019-012398

(51) Int. Cl.
*H04L 67/562* (2022.01)
*G06F 9/54* (2006.01)
*H04L 67/55* (2022.01)

(52) U.S. Cl.
CPC ............ *H04L 67/562* (2022.05); *G06F 9/546* (2013.01); *H04L 67/55* (2022.05)

(58) Field of Classification Search
CPC ........ H04L 67/562; H04L 67/55; G06F 9/546
See application file for complete search history.

(56) References Cited

U.S. PATENT DOCUMENTS

2016/0248871 A1    8/2016  Seed et al.
2017/0195318 A1*  7/2017  Liu .......................... H04L 67/10
(Continued)

FOREIGN PATENT DOCUMENTS

JP    2018018502 A    2/2018
JP    2018512645 A    5/2018
(Continued)

OTHER PUBLICATIONS

Yugo Nakamura and four others, "Design of Middleware for Distributed Processing of Various IoT Data Streams in Cloudless Manner", Technical Report, Mobile Computing and Pervasive Systems (MBL), 2015.22 (2015): 1-8.

(Continued)

*Primary Examiner* — Wing F Chan
*Assistant Examiner* — Billy H Ng
(74) *Attorney, Agent, or Firm* — Harness, Dickey & Pierce, P.L.C.

(57) ABSTRACT

A message transmitting and receiving method according to one aspect is performed by a communication apparatus, the communication apparatus including a middleware unit configured to manage a message published by a publisher in a publish/subscribe system in which a message is exchanged between the publisher and a subscriber via a broker, and a storage unit configured to store a library including functions configured to provide the broker, and includes the steps of performing, by the middleware unit, subscribing on the (Continued)

broker by setting a callback function, and upon receipt of a first message published by a device, passing, by the broker, the first message to the middleware unit by calling the callback function.

15 Claims, 5 Drawing Sheets

(56) References Cited

U.S. PATENT DOCUMENTS

| | | |
|---|---|---|
| 2018/0035479 A1 | 2/2018 | Lee et al. |
| 2018/0167476 A1 | 6/2018 | Hoffner et al. |
| 2019/0089648 A1 | 3/2019 | Chang et al. |
| 2019/0373081 A1* | 12/2019 | Jung .................... H04W 88/16 |
| 2021/0176326 A1* | 6/2021 | Carley .................... G06F 9/546 |
| 2021/0211515 A1* | 7/2021 | Rozo .................. H04L 63/0861 |

FOREIGN PATENT DOCUMENTS

| | | |
|---|---|---|
| WO | WO-2017198088 A1 | 11/2017 |
| WO | WO-2018112327 A1 | 6/2018 |

OTHER PUBLICATIONS

L. Atozori et al., "Internet of the Things: A Survey", Computer Networks 54 (2010) 2787-2805.

International Search Report issued in PCT/JP2019/046760, dated Feb. 18, 2020.

* cited by examiner

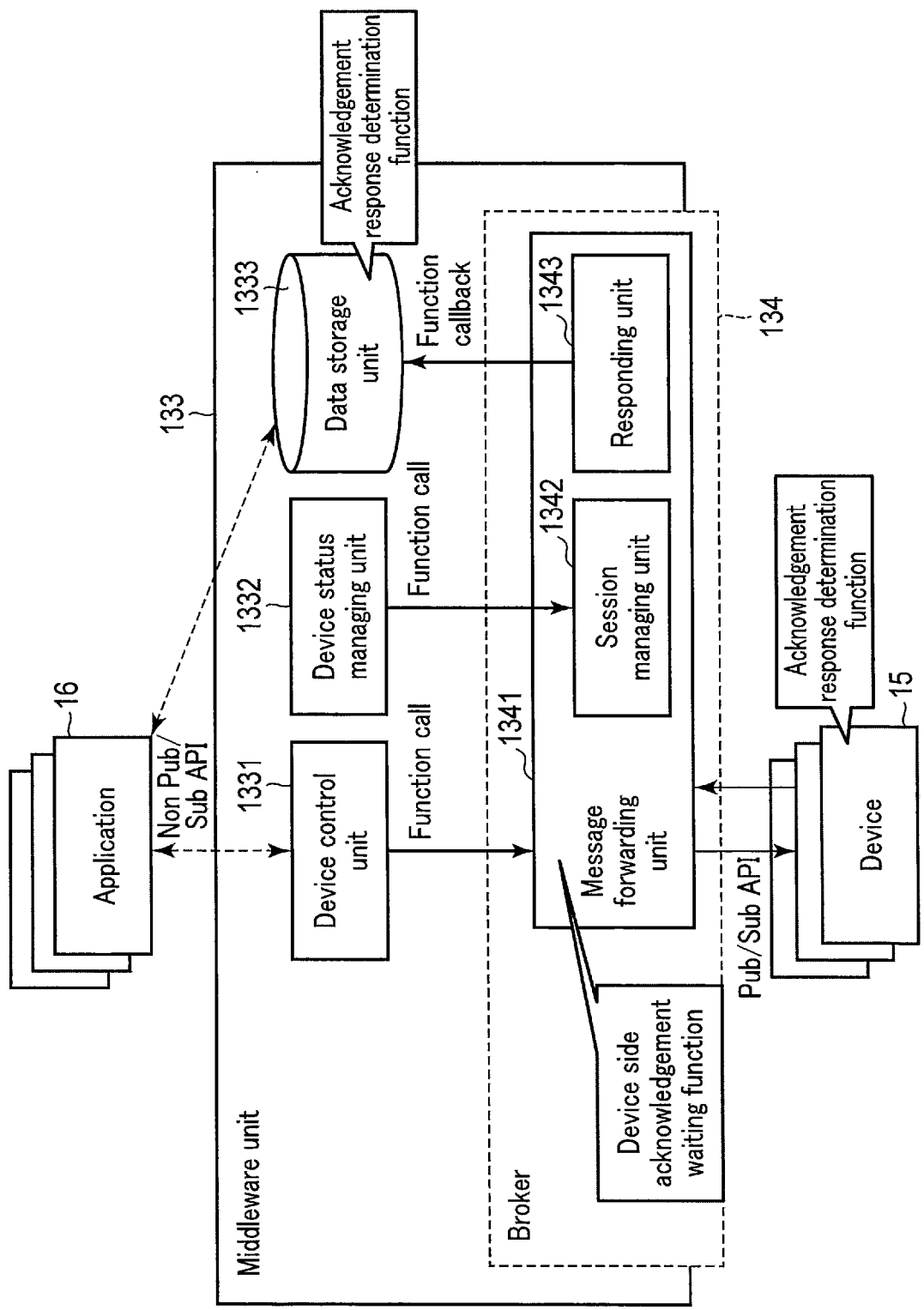
F I G. 2

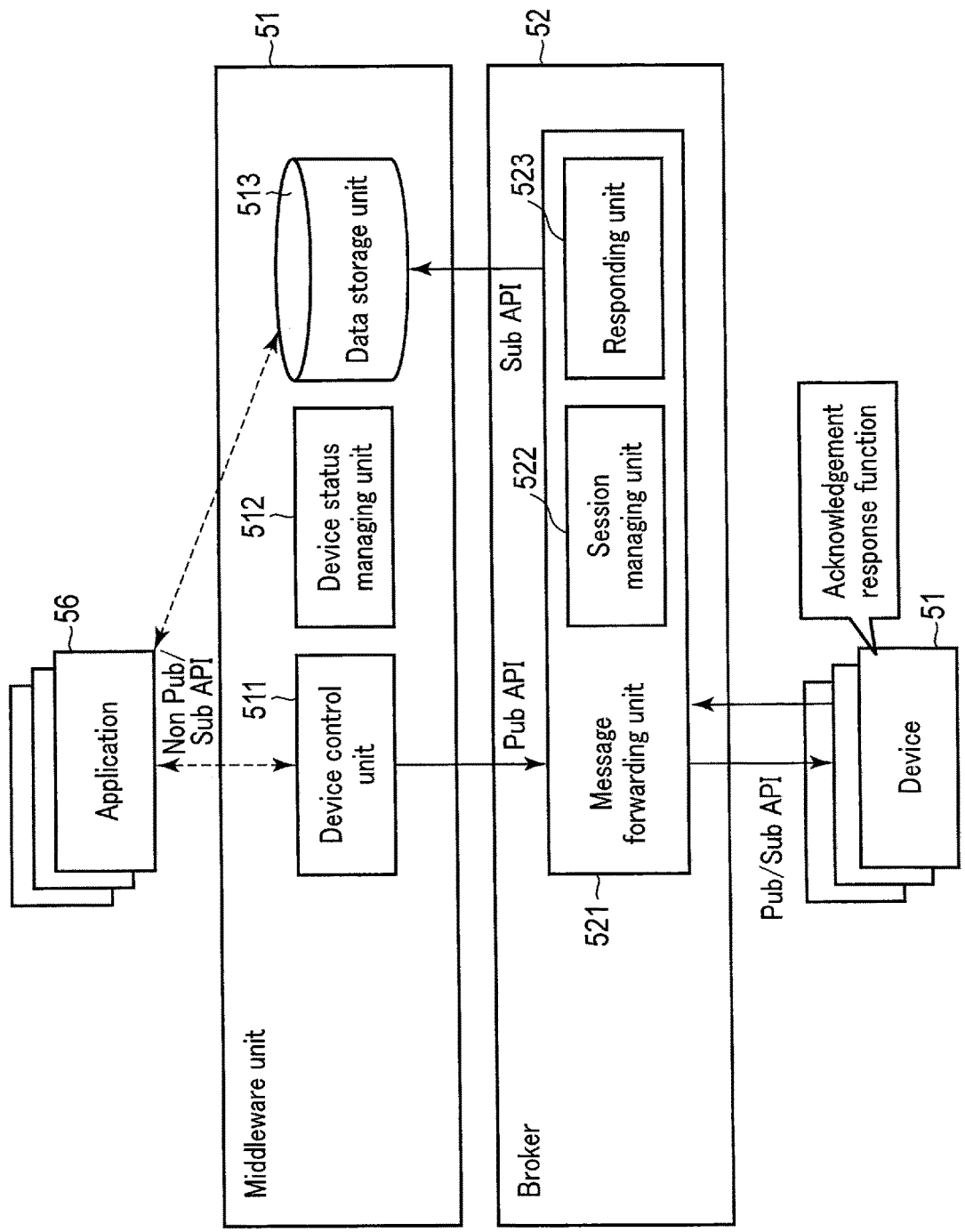
F I G. 6

MESSAGE TRANSMITTING AND RECEIVING METHOD, COMMUNICATION APPARATUS, AND PROGRAM

CROSS-REFERENCE TO RELATED APPLICATIONS

This application is a 371 U.S. National Phase of International Application No. PCT/JP2019/046760 filed on Nov. 29, 2019 which claims priority to Japanese Application No. 2019-012398 filed on Jan. 28, 2019. The entire disclosures of the above applications are incorporated herein by reference.

FIELD

The present invention relates generally to a technique for transmitting and receiving device-generated data as a message according to a publish/subscribe model.

BACKGROUND

With the spread of Internet of Things (IoT), many devices such as sensors have a function of transmitting and receiving data. When a large number of devices and applications that manage the devices perform communications individually, the number of communication partners becomes enormous, which makes it extremely troublesome to identify a communication partner.

Under the above circumstances, the convenience of a broker-based publish/subscribe model in which messages are exchanged without individually identifying a communication partner has attracted attention. In recent years, this publish/subscribe model has been adopted in many IoT systems.

In an IoT system that adopts the publish/subscribe model, publishers and subscribers are not always evenly distributed. For this reason, a server that subscribes to all messages and temporarily stores them may be provided between a broker and an application (see, for example, Non-Patent Documents 1 and 2).

CITATION LIST

Non-Patent Literature 1

Yugo Nakamura and four others, "Design of Middleware for Distributed Processing of Various IoT Data Streams in Cloudless Manner", Technical Report, Mobile Computing and Pervasive Systems (MBL), 2015.22 (2015): 1-8.

Non-Patent Literature 2

L. Atozori et al, "Internet of the Things: A Survey", Computer Networks 54 (2010) 2787-2805.

SUMMARY

Technical Problem

However, the aforementioned IoT system including the server has a problem wherein traffic between a broker and a server increases and congestion is likely to occur. This leads to a decrease in reliability of the IoT system.

The present invention has been made in view of the above circumstances, and aims to provide a technique that realizes a highly reliable IoT system.

Solution to Problem

In a first aspect of the present invention, a message transmitting and receiving method is performed by a communication apparatus, the communication apparatus comprising a middleware unit configured to manage a message published by a publisher in a publish/subscribe system in which a message is exchanged between the publisher and a subscriber via a broker, and a storage unit configured to store a library including functions configured to provide the broker, and comprises the steps of: performing, by the middleware unit, subscribing on the broker by setting a callback function; and upon receipt of a first message published by a device, passing, by the broker, the first message to the middleware unit by calling the callback function.

In a second aspect of the present invention, the message transmitting and receiving method further comprises the steps of: when the callback function is called, returning, by the middleware unit, a function in which whether or not predetermined processing including storage of the first message has succeeded is assigned to a return value; and transmitting to the device information indicating whether or not the first message has arrived at the middleware unit, depending on the function returned by the middleware unit.

In a third aspect of the present invention, the message transmitting and receiving method further comprises the step of publishing, by the middleware unit, a second message with respect to the broker by performing a function call.

In a fourth aspect of the present invention, the message transmitting and receiving method further comprises the step of returning, by the broker, a function in which whether or not the second message has arrived at the device is assigned to a return value.

In a fifth aspect of the present invention, the message transmitting and receiving method further comprises the step of acquiring, by the middleware unit, device status information indicating a status of the device, from the broker by performing a function call.

In a sixth aspect of the present invention, the device status information includes at least one of session information indicating a status of connection with the device and active-and-inactive information indicating an active-and-inactive status of the device.

Advantageous Effects of Invention

According to the first aspect, congestion that occurs when a middleware unit and a broker are provided in separate devices is alleviated. As a result, a highly reliable IoT system can be realized.

According to the second aspect, the delivery confirmation can be performed between the middleware unit and the device. As a result, the reliability of the IoT system is further improved.

According to the third aspect, the middleware unit can provide the device with information such as a control command for controlling the device.

According to the fourth aspect, the delivery confirmation can be performed between the middleware unit and the device. As a result, the reliability of the IoT system is further improved.

According to the fifth aspect, the middleware unit can acquire device status information in real time. As a result, the reliability of the IoT system is further improved.

According to the sixth aspect, the middleware unit can determine in real time whether or not a device which is a message transmission destination is in a communicable status, thereby increasing the possibility that the message will arrive at the device. As a result, the reliability of the IoT system is further improved.

In short, according to the present invention, it is possible to provide a technique that realizes a highly reliable IoT system.

BRIEF DESCRIPTION OF THE DRAWINGS

FIG. 2 is a block diagram showing a communication apparatus shown in FIG. 1.

FIG. 6 is a block diagram illustrating a communication system according to a related art.

DETAILED DESCRIPTION

Hereinafter, embodiments of the present invention will be described with reference to the drawings.

Related Art

First, a communication system according to a related art will be described with reference to FIG. 5 and FIG. 6.

Figure 5:
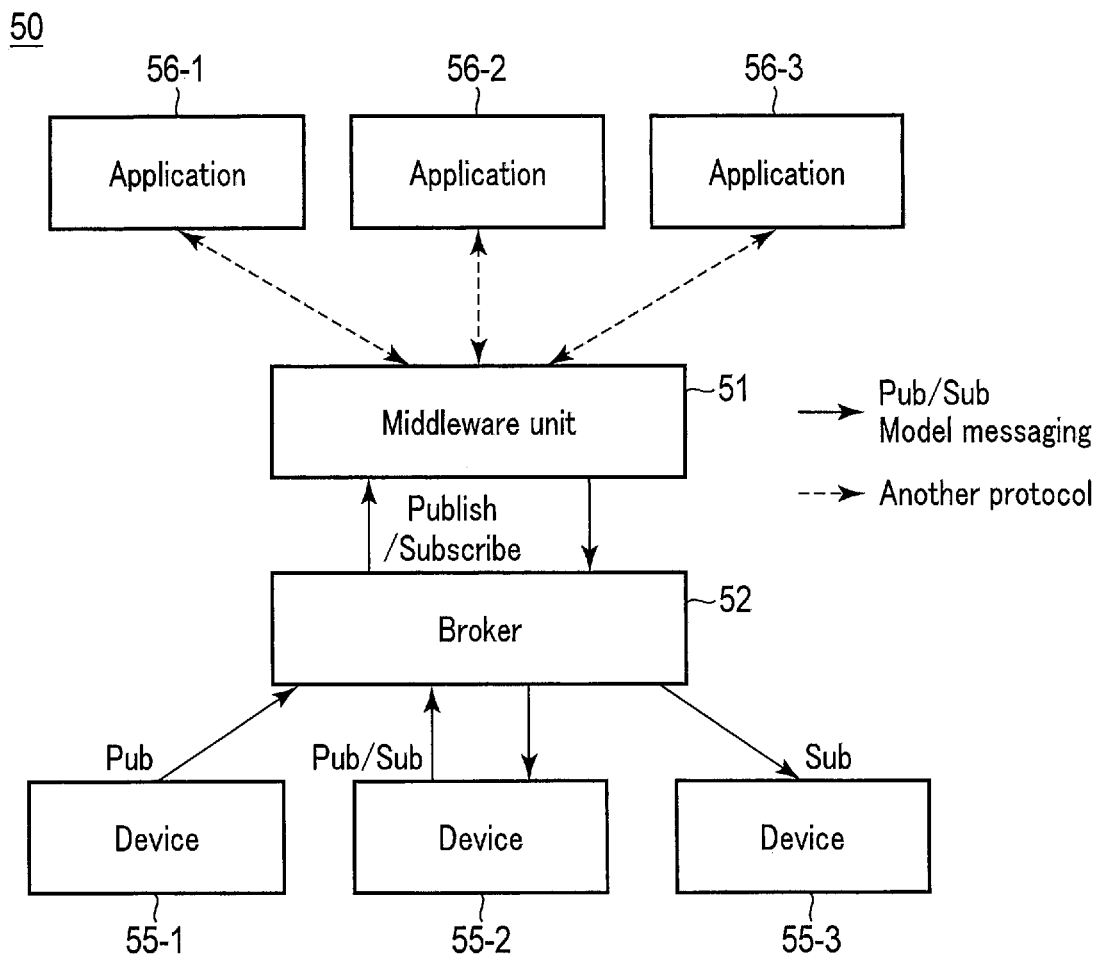
FIG. 5 is a block diagram illustrating a communication system according to a related art.

FIG. 5 schematically shows a communication system 50 according to a related art. The communication system 50 shown in FIG. 5 is an IoT system including a broker-based publish/subscribe (Pub/Sub) system in which a message is exchanged between a publisher and a subscriber via a broker.

In the Pub/Sub system, a broker relays a message between a publisher and a subscriber. A publisher refers to a sender of a message. A publisher publishes a message to a topic. Specifically, the publisher specifies a topic as a publishing target and transmits, to a broker, a message containing data and topic information indicating the specified topic. A subscriber refers to a receiver of a message. A subscriber subscribes to a topic of interest. Specifically, the subscriber registers subscriptions for a topic of interest with a broker. Upon receipt of a message from the publisher, the broker temporarily stores the message and forwards it to a subscriber who subscribes to a topic specified by the publisher.

The communication system 50 includes a middleware unit 51, a broker 52, a device 55, and an application 56. In FIG. 5, three devices 55-1, 55-2, and 55-3 are shown as the device 55, and three applications 56-1, 56-2, and 56-3 are shown as the application 56.

The broker 52 is a broker in the Pub/Sub system. The broker 52 is implemented in a computer terminal such as a server. The broker 52 is implemented by a broker program being executed by a computer terminal.

The device 55 has functioning of at least one of the publisher and the subscriber. For example, the device 55-1 has functioning of the publisher, the device 55-2 has functions of the publisher and the subscriber, and the device 55-1 has functioning of the subscriber. For example, the device 55-1 includes a sensor and transmits, to the broker 52, a message containing topic information and sensor data generated by the sensor.

The middleware unit 51 is implemented in a computer terminal such as a server, which is different from a computer terminal in which the broker 52 is implemented. The middleware unit 51 is implemented by the IoT middleware as a program being executed by a computer terminal.

The middleware unit 51 has functions of the publisher and the subscriber, and communicates with the broker 52 according to the Pub/Sub model. Furthermore, the middleware unit 51 communicates with the application 56 according to a protocol different from the Pub/Sub model. The application 56 is implemented in a computer terminal different from a computer terminal in which the middleware unit 51 is implemented.

The middleware unit 51 manages a message published by a publisher on the device 55. The middleware unit 51 subscribes to all topics. In this manner, all the messages published by the device 55 are transmitted to the middleware unit 51 via the broker 52. The middleware unit 51 receives, from the application 56, topic information indicating a topic that the application 56 desires to subscript to. The middleware unit 51 forwards a message published by the device 55 based on topic information received from the application 56. For example, upon receipt of a message published to a certain topic, the middleware unit 51 transmits this message to the application 56 that desires to subscribe to the topic.

Assume that the application 56-1 controls the device 55-2. The application 56-1 transmits, to the middleware unit 51, a control signal containing a control command for controlling the device 55-2. Upon receipt of the control signal from the application 56-1, the middleware unit 51 publishes a message containing the control command to a topic subscribed to by the device 55-2. Upon receipt of the message published by the middleware unit 51, the broker 52 transmits this message to the device 55-2. The device 55-2 receives a message from the broker 52 and operates in accordance with the control command from the application 56-1 contained in the received message.

In the communication system 50 according to the related art, the broker 52 is realized by executing one program on a computer terminal, and communicates with another module (for example, the middleware unit 51) via a network.

The communication system 50 having the above-described configuration has three problems, described below.

1. For example, the publisher on the device 55 may desire to confirm whether or not the middleware unit 51 has completed saving of a message, and may desire to retransmit the message if the middleware unit 51 has not completed saving of the message. However, it is difficult to perform a message delivery confirmation between the publisher on the device 55 and the middleware unit 51. This is because in the Pub/Sub system, the completion of communication is generally confirmed only between the publisher and the broker and between the subscriber and the broker. Specifically, returning acknowledgment information indicating the completion of communication enables a delivery confirmation indicating that a communication between two parties has been completed. In order to perform a delivery confirmation between the publisher and the subscriber, a notification of the completion is required between three parties, which complicates the sequence. Furthermore, not only the completion of communication but also the completion of processing including saving of data may be desired. This case makes the sequence even more complicated.

2. Device status information indicating a status of the device 55, such as a status of connection with the device 55, is present in the broker 52. Therefore, it is difficult for the middleware unit 51 to confirm whether or not the device is in a communicable status.

3. A traffic between the middleware unit 51 and the broker 52 increases and congestion is likely to occur.

Here, functions of the middleware unit 51 and the broker 52 in the communication system 50 described above will be described in detail.

Referring to FIG. 6, the broker 52 includes a message forwarding unit 521. The message forwarding unit 521 includes a session managing unit 522 and a responding unit 523.

The message forwarding unit 521 receives a message from the device 55 by using the Pub/Sub API (Application Programming Interface). The message forwarding unit 521 transmits the received message to the middleware unit 51 by using the Pub/Sub API.

Furthermore, the message forwarding unit 521 receives a message from the device control unit 511 by using the Pub/Sub API. The message forwarding unit 521 transmits the received message to an appropriate device 55 by using the Pub/Sub API. When receiving a message from the broker 52 and storing it in a memory, the device 55 transmits, to the broker 52, acknowledgment information indicating that the message has been successfully received.

The session managing unit 522 holds and manages device status information indicating a status of the device 55. The device status information includes session information indicating a status of connection with the device 55. Furthermore, the session managing unit 522 holds and manages subscription information indicating which topic each device 55 subscribes to.

The responding unit 523 transmits acknowledgment information to the middleware unit 51 when the message forwarding unit 521 receives a message from the middleware unit 51 and stores it in a database. Furthermore, the responding unit 523 transmits acknowledgment information to the middleware unit 51 when the message forwarding unit 521 receives a message from the device 55 and stores it in the database.

The middleware unit 51 includes the device control unit 511, a device status managing unit 512, and a data storage unit 513.

The data storage unit 513 receives a message from the broker 52 and temporarily stores the data included in the received message in the database. The data storage unit 513 is capable of reading data such as data stored in the past from the database. By using non-Pub/Sub API, the middleware unit 51 provides the application 56 with the data read from the data storage unit 513.

The middleware unit 51 registers subscriptions for all topics with the broker 52. In this manner, all pieces of the data published by the device 55 arrive at the middleware unit 51 and are stored in the database. At this time, the above-mentioned problem 1, that is, the problem that the device 55 cannot confirm whether or not data has been stored in the database in the middleware unit 51 arises. In the Pub/Sub system, the broker 52 determines whether or not a communication has been completed normally. Thus, no consideration is given to transactions regarding whether or not the middleware unit 51 has received a message and completed storage of the received message. The device 55 is notified of only information indicating whether or not a communication between the device 55 and the broker 52 has succeeded or not. Furthermore, since all the messages are passed to the middleware unit 51, the traffic between the middleware unit 51 and the broker 52 becomes large, and the above-mentioned problem 3 also occurs.

The device status managing unit 512 acquires device status information from the broker 52. Based on the device status information, the device status managing unit 512 determines whether or not each device 55 is in a communicable status. Generally, the Pub/Sub system has no API for exchanging device status information between the middleware unit 51 and the broker 52. Therefore, the middleware unit 51 is incapable of acquiring device status information in real time. In other words, the middleware unit 51 is incapable of determining a current status of a device. This causes the above-mentioned problem 2.

The device control unit 511 controls the device 55. The device control unit 511 acquires a control signal from the application 56 by using the non-Pub/Sub API. The non-Pub/Sub API is a discretionary API that is different from the Pub/Sub API. The control signal includes control target information indicating the device 55 to be controlled, and a control command for controlling the device 55. In the case where the device status managing unit 512 determines that the device 55 to be controlled is in a status in which it can receive a control command, the device control unit 511 transmits a message including a control command to the broker 52 by using the Pub/Sub API. The broker 52 transmits the message received from the middleware unit 51 to the device 55 to be controlled. At this time also, the problem 1 occurs. That is, the middleware unit 51 can confirm whether or not the broker 52 has successfully received a message but cannot confirm whether or not the device 55 to be controlled has successfully received a message. Furthermore, as in the problem 2, the middleware unit 51 cannot acquire device status information in real time and thus cannot grasp whether or not the device 55 to be controlled is currently in a communicable status. This makes the situation more complicated.

Embodiment

Next, the communication system according to an embodiment of the present invention will be described.

An embodiment solves the above problems by incorporating the broker as a library into an IoT middleware. The broker is prepared as a shared library and linked to IoT middleware (software) at the binary level. The middleware unit and the broker operate as the same process. In other words, each of the middleware unit and the broker is a part of the same binary.

[Configuration]

Figure 1:
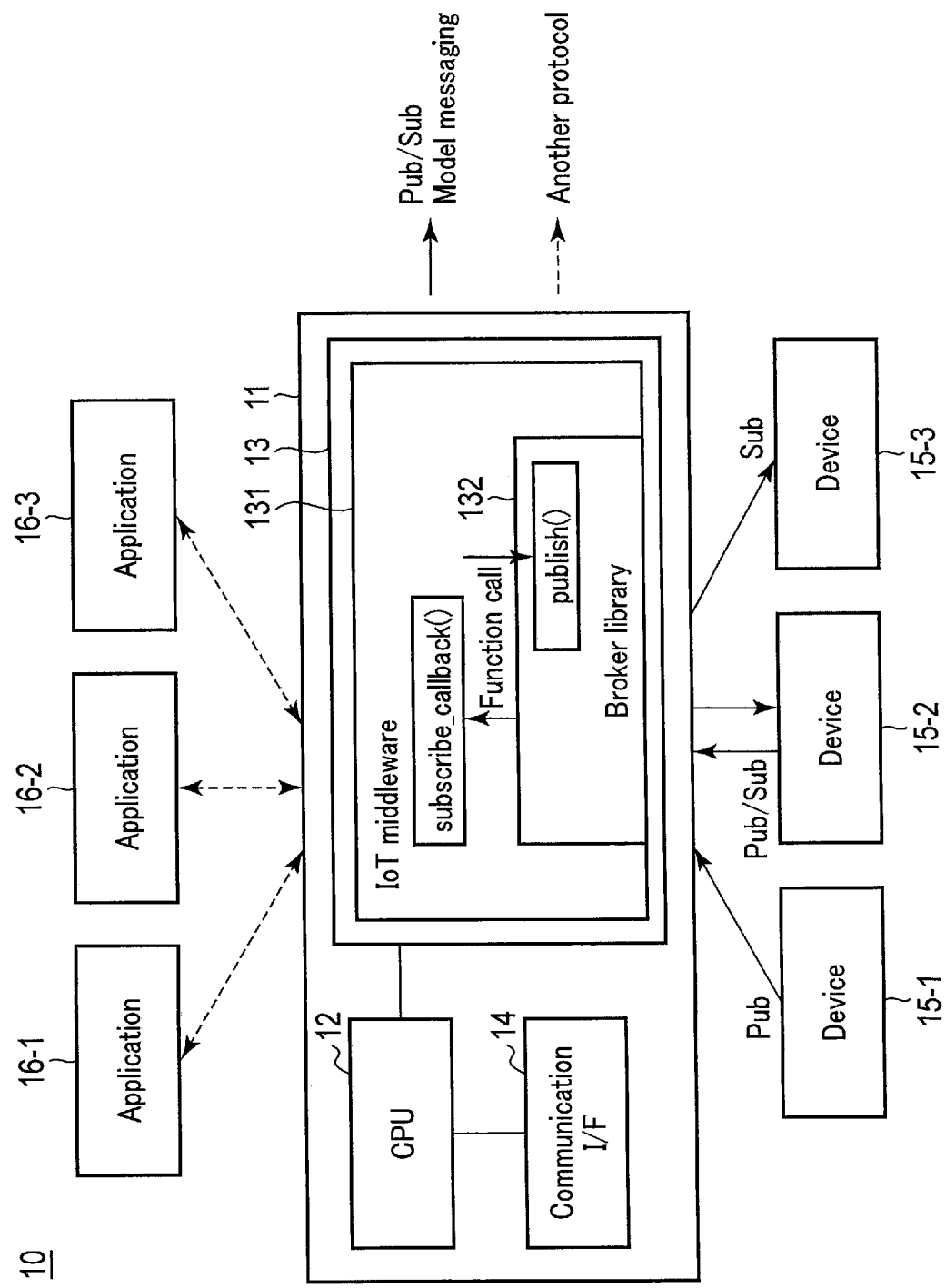
FIG. 1 is a block diagram showing a communication system according to an embodiment of the present invention.

FIG. 1 schematically shows a communication system 10 according to one embodiment of the present invention. The communication system 10 shown in FIG. 1 is an IoT system including a broker-based Pub/Sub system.

The communication system 10 includes a communication apparatus 11, a device 15, and an application 16. In FIG. 1, three devices 15-1, 15-2, and 15-3 are shown as the device 15, and three applications 16-1, 16-2, and 16-3 are shown as the application 16. The devices 15-1, 15-2, and 15-3 are similar to the devices 55-1, 55-2, and 55-3 shown in FIG. 5, respectively. The applications 16-1, 16-2, and 16-3 are similar to the applications 56-1, 56-2, and 56-3 shown in FIG. 5, respectively.

The communication apparatus 11 may be a computer terminal such as a server. The communication apparatus 11 includes, as hardware components, a central processing unit (CPU) 12, a memory 13 corresponding to a storage unit, and a communication interface 14.

The CPU 12 is an example of a processor. The memory 13 includes a primary storage device and a secondary storage device. The primary storage device is a volatile memory such as synchronous dynamic random access memory (SDRAM), and is used as a working memory by the CPU 12. The secondary storage device is a non-volatile memory such as a hard disk drive (HDD) or solid state drive (SSD), and stores a program such as IoT middleware 131, data required to execute the program, data (such as sensor data) included in a message published by the publisher, device status information, subscription information, etc.

The communication interface 14 is an interface for communicating with an external device (such as the device 15, the application 16, etc.).

Referring to FIG. 2, the communication apparatus 11 includes a middleware unit 133 and a broker 134. The middleware unit 133 is implemented by the CPU 12 executing the IoT middleware 131. As shown in FIG. 1, a broker library 132 is incorporated into the IoT middleware 131. The broker library 132 is linked to the IoT middleware 131 at the binary level. The broker library 132 includes functions that provides the broker 134. The functions comprises a plurality of functions including the function "publish( )" for transmitting a message. When executed by the CPU 12, the IoT middleware 131 causes the CPU 12 to operate as the middleware unit 133 and the broker 134.

The broker 134 is a broker in the Pub/Sub system. Specifically, the broker 134 relays messages between a publisher and a subscriber.

The middleware unit 133 manages a message published by a publisher on the device 15. The middleware unit 133 communicates with the broker 134 by using a function call. For example, when operating as a subscriber, the middleware unit 133 performs subscribing on the broker 134 by setting a callback function. When operating as a publisher, the middleware unit 133 performs publishing on the broker 134 by performing a function call.

The middleware unit 133 communicates with the application 16 according to a protocol different from the Pub/Sub model. The application 16 is implemented in a computer terminal different from the communication apparatus 11.

The middleware unit 133 subscribes to all topics. In this case, all the messages published by the device 15 are transmitted to the middleware unit 133 via the broker 134. The middleware unit 133 sets the function "subscribe_callback( )" as a callback function. Upon receipt of a message from the device 15, the broker 134 assigns, to arguments "topic" and "payload", topic information and data included in the message, and calls the callback function. In this manner, the middleware unit 133 acquires a message published by the device 55. The middleware unit 133 receives, from the application 16, topic information indicating a topic desired to be subscribed to. The middleware unit 133 forwards a message published by the device 15 based on the topic information received from the application 16. For example, upon receipt of a message published by the device 15 to a topic, the middleware unit 133 transmits this message to the application 16 that desires to subscribe to the topic. The middleware unit 133 may convert data contained in the message published by the device 15 into a format available for the application 16.

Assume that the application 16-1 controls the device 15-2. The application 16-1 transmits, to the middleware unit 133, a control signal containing a control command for controlling the device 15-2. Upon receipt of a control signal from the application 16-1, the middleware unit 133 assigns the control command to an argument "payload", assigns topic information indicating a topic subscribed to by the device 15-2 to an argument "topic", and calls the function "publish( )". In this manner, the broker 134 transmits a message including topic information and a control command to the device 15-2. The device 15-2 receives a message from the broker 134 and operates in accordance with the control command from the application 16-1 contained in the received message.

As shown in FIG. 2, the broker 134 includes a message forwarding unit 1341. The message forwarding unit 1341 includes a session managing unit 1342 and a responding unit 1343. The message forwarding unit 1341, a session managing unit 1342, and a responding unit 1343 are prepared as functions in the broker library 132.

The message forwarding unit 1341 receives a message from the device 15 using the Pub/Sub API. The message forwarding unit 1341 transmits the message received from the device 15 to the middleware unit 133, by using the Pub/Sub API. Specifically, the message forwarding unit 1341 calls the callback function "subscribe_callback( )" in which the topic information and data included in the message received from the device 15 are assigned.

The message forwarding unit 1341 transmits a message to the device 15 using the Pub/Sub API. Specifically, the middleware unit 133 calls the function "publish( )" in which topic information and data (for example, a control command) are assigned. In this manner, a message including topic information and data is transmitted to the device 15.

The session managing unit 1342 manages device status information indicating a status of the device 15. The device status information includes session information indicating a status of connection with the device 15. Specifically, the session information indicates, for each device 15, whether or not a session between the device 15 and the communication apparatus 11 is currently established. The device status information may include active-and-inactive information indicating an active-and-inactive status (normality) of the device 15 in place of or in addition to the session information. Furthermore, the session managing unit 1342 manages subscription information indicating which topic each device 15 subscribes to. The middleware unit 133 acquires device information and subscription information by calling a function corresponding to the session managing unit 1342.

The responding unit 1343 passes, to the middleware unit 133, information indicating whether or not a message published by the middleware unit 133 has arrived at the device 15. Specifically, in the case of receiving acknowledgment information from the device 15 until a predetermined time has elapsed from the transmission of a message published by the middleware unit 133, the responding unit 1343 returns, to the middleware unit 133, a function in which the arrival of the message to the device 15 is assigned to a return value. Furthermore, in the case of not receiving acknowledgment information from the device 15 until a predetermined time has elapsed from the transmission of a message published by the middleware unit 133, the responding unit 1343 returns, to the middleware unit 133, a function in which the non-arrival of the message to the device 15 is assigned to a return value.

The middleware unit 133 includes the device control unit 1331, a device status managing unit 1332, and a data storage unit 1333.

The data storage unit 1333 temporarily stores, in the database, a message which is published by the device 15 and includes topic information and data (for example, sensor data). For example, the data storage unit 1333 temporarily stores, in the database, data in such a manner that the data is associated with topic information. As described above, a message published by the device 15 is passed from the broker 134 to the middleware unit 133 by using the callback function set for the broker 134. The data storage unit 1333 reads data such as data stored in the past from the database. The middleware unit 133 utilizes the non-Pub/Sub API to provide the appropriate application 16 with the data read by the data storage unit 1333.

In response to a message from the broker 134, the middleware unit 133 notifies the broker 134 of whether or not predetermined processing including storage of the message by the data storage unit 1333 has succeeded, that is, whether or not the message has been received successfully. In the case where the data storage unit 1333 successfully stores a message, the middleware unit 133 returns, to the broker 134, a function in which the success of processing is assigned to a return value. Furthermore, in the case where the data storage unit 1333 fails in predetermined processing such as storage of a message, the middleware unit 133 returns, to the broker 134, a function in which the failure of processing is assigned to a return value.

The device status managing unit 1332 acquires the device status information and the subscription information from the broker 134. Specifically, the device status managing unit 1332 calls a function corresponding to the session managing unit 1342, thereby acquiring the device status information and the subscription information. Based on the device status information, the device status managing unit 1332 determines whether or not each device 15 is in a communicable status or not.

The device control unit 1331 controls the device 15. The device control unit 1331 acquires a control signal from the application 16 by using a non-Pub/Sub API (Application Programming Interface). The control signal includes control target information indicating the device 15 to be controlled, and a control command for controlling the device 15. When the device control unit 1331 receives the control signal, the device status managing unit 1332 determines based on the device status information whether or not the device 15 to be controlled is in a communicable status. In the case where the device 15 to be controlled is not in a communicable status, the device control unit 1331 stands by until the device 15 to be controlled gets into a communicable status. When the device 15 to be controlled is in a communicable status, the device control unit 1331 publishes a message including a control command to the broker 134. Specifically, the device control unit 1331 calls the function "publish( )" in which the topic information corresponding to the device 15 to be controlled and the control command are assigned. In this manner, a message including the topic information and the control command is transmitted to the device 15 to be controlled.

As the Pub/Sub system, for example, Message Queuing Telemetry Transport (MQTT) is usable. When using MQTT, an interface between the broker 134 and the device 15 conforms to MQTT. An interface between the broker 134 and the middleware unit 133 is based on a function call without conforming to MQTT.

[Operation]

An operation example of the communication apparatus 11 having the above-described configuration will be described.

Figure 3:
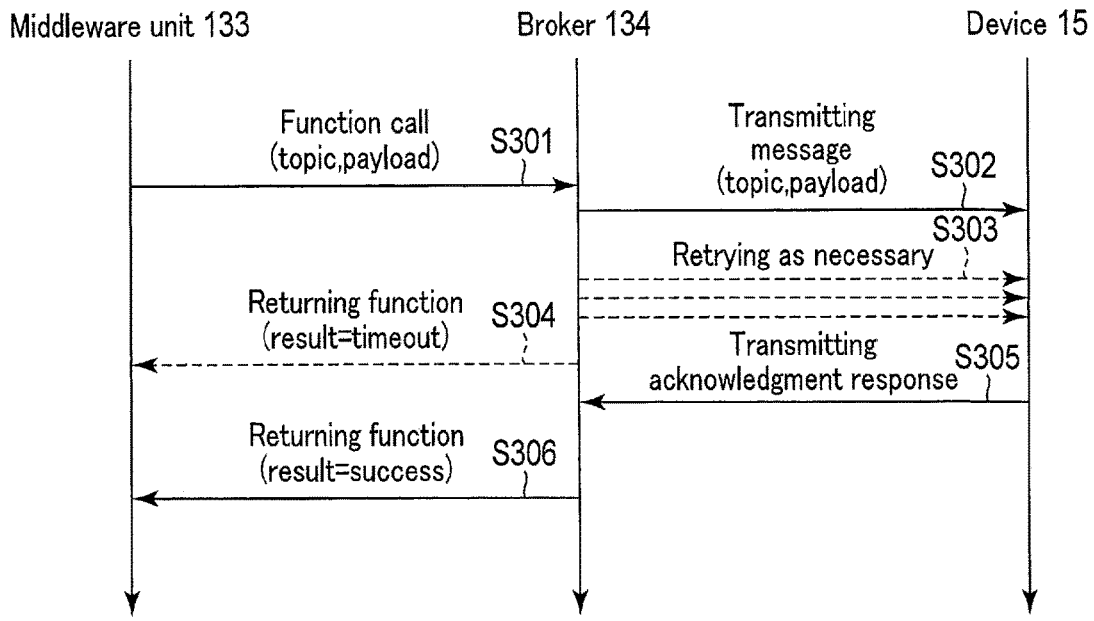
FIG. 3 is a sequence diagram when a middleware unit shown in FIG. 2 performs publishing.

FIG. 3 shows an example of a processing procedure of the communication apparatus 11 in the case where the middleware unit 133 performs publishing.

As shown in FIG. 3, the middleware unit 133 publishes a message with respect to the broker 134 by performing a function call (step S301), and the broker 134 transmits the message to the device 15 (step S302). Specifically, the middleware unit 133 assigns topic information to an argument "topic", assigns data to an argument "payload", and calls the function "publish( )". In this manner, a message including topic information and data is transmitted to the device 15. If necessary, the broker 134 retransmits the message to the device 15 (step S303).

The broker 134 returns a function in which whether or not a message has arrived at the device 15 is assigned to a return value. This enables the middleware unit 133 to confirm whether or not the message has arrived at the device 15.

The device 15 may fails to receive a message. In such a case, the device 15 does not transmit the acknowledgment information to the broker 134. In the case where the broker 134 receives no acknowledgment information from the device 15 until a predetermined time has elapsed from the transmission of a message, the broker 134 determines that the device 15 fails to receive the message. The broker 134 returns, to the middleware unit 133, a function in which the non-arrival of the message to the device 15 (timeout) is assigned to a return value (step S304).

On the other hand, in the case of receiving a message from the broker 134 and storing the received message in a memory, the device 15 transmits the acknowledgment information to the broker 134 (step S305). Upon receipt of the acknowledgment information from the device 15, the broker 134 returns, to the middleware unit 133, a function in which the arrival of the message to the device 15 (success) is assigned to a return value (step S306).

In this way, in the case of the middleware unit 133 performing publishing, the confirmation of arrival between the middleware unit 133 and the device 15 is performed.

The sequence shown in FIG. 3 corresponds to a case in which messaging from the broker 134 to the device 15 corresponds to a Quality of Service 1 (QoS1) of MQTT, that is, the case of using a protocol that confirms at least one arrival of a message to the device 15.

Figure 4:
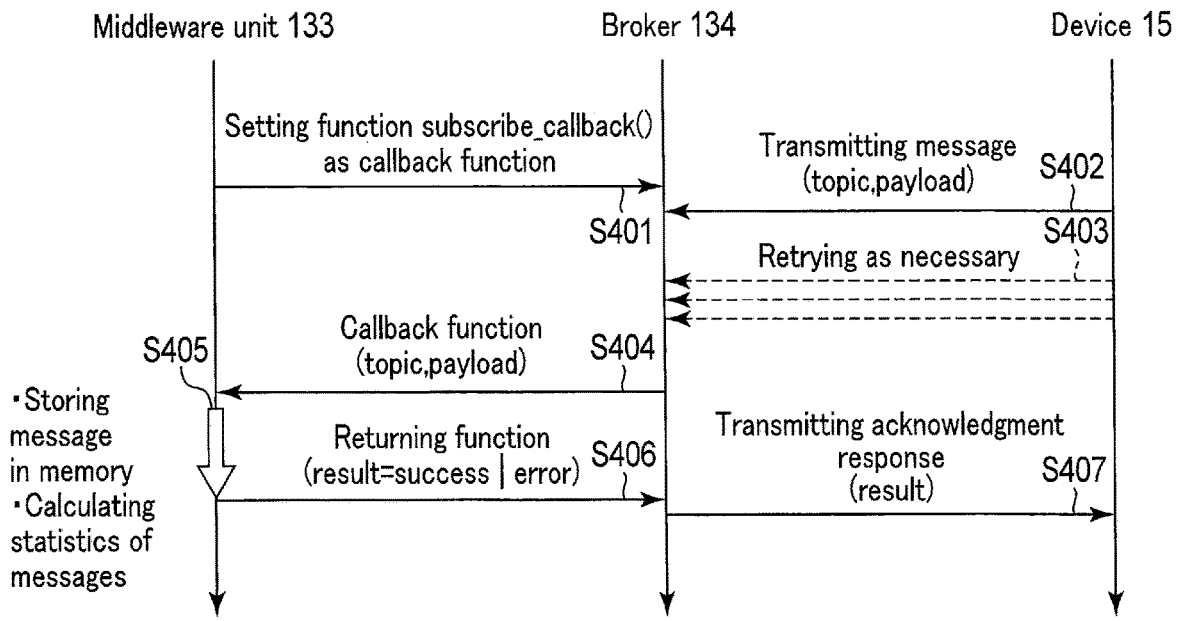
FIG. 4 is a sequence diagram when the middleware unit shown in FIG. 2 performs subscribing.

FIG. 4 shows an example of a processing procedure of the communication apparatus 11 in the case where the middleware unit 133 performs subscribing.

As shown in FIG. 4, the middleware unit 133 performs subscribing on the broker 134 by setting of the callback function (step S401). Specifically, the middleware unit 133 sets the function "subscribe_callback( )" as a callback function.

Thereafter, the device 15 publishes a message (step S402). Specifically, the device 15 transmits a message containing topic information and sensor data to the broker 134. If necessary, the device 15 retries publishing (step S403).

Upon receipt of a message from the device 15, the broker 134 passes the received message to the middleware unit 133 by calling the set callback function (step S404). Specifically, the broker 134 assigns, to arguments "topic" and "payload", the topic information and sensor data included in the received message, and calls the set callback function.

The middleware unit 133 performs predetermined processing including processing of storing in the memory 13, a message received from the broker 134 (step S405). The predetermined processing may further include processing of calculating statistics of messages.

Subsequently, the middleware unit 133 returns a function in which whether predetermined processing has succeeded or not is assigned to a return value (step S406). Specifically, if predetermined processing is completed, the middleware unit 133 returns, to the broker 134, a function in which the success of processing is assigned to a return value. If not, the middleware unit 133 returns, to the broker 134, a function in which the failure of processing is assigned to a return value.

The broker 134 transmits, to the device 15, information corresponding to the function returned by the middleware unit 133 (step S407). Specifically, the broker 134 transmits acknowledgment information to the device 15 in the case of the success of processing being assigned to a return value, and transmits negative-acknowledgment information to the device 15 in the case of the failure of processing being assigned to a return value. This enables the device 15 to confirm whether or not a message has arrived at the middleware unit 133. The broker 134 may not transmit negative-acknowledgment information. In such a case, when no acknowledgment information is received from the device 15, the device 15 determines that a message has not arrived at the middleware unit 133.

In this way, in the case of the middleware unit 133 performing publishing, the confirmation of arrival between the middleware unit 133 and the device 15 is performed.

The sequence shown in FIG. 4 corresponds to the case in which messaging from the broker 134 to the device 15 corresponds to QoS1 of MQTT.

A delivery confirmation between the middleware unit 133 and the device 15 may not always be required.

Advantageous Effect

In the communication apparatus 11 according to the present embodiment, the broker 134 is incorporated as a library into the middleware unit 133, and communication between the middleware unit 133 and the broker 134 is performed by using a function call. Therefore, a communication between the middleware unit 133 and the broker 134 is performed without a network intervening therebetween. This realizes a reduction in congestion that occurs in the related arts described above. Furthermore, the communication between the middleware unit 133 and the broker 134 becomes faster and wider than the communication via the network, so that a larger amount of data can be received and transmitted. As a result, the reliability of the IoT system is improved.

The middleware unit 133 performs subscribing on the broker 134 by setting a callback function. When receiving a message published by the device 15, the broker 134 calls the callback function, thereby passing the message to the middleware unit 133. The middleware unit 133 assigns a result of reception processing (success or failure) to a return value of the callback function, and the broker 134 transmits a response depending on the return value, to the device 15. This enables the device 15 to confirm whether or not a message has arrived at the middleware unit 133.

The middleware unit 133 calls a function corresponding to publishing and waits for the return value of the function. The broker 134 sets a return value in accordance with whether or not there is a response from the device 15. This enables the middleware unit 133 to confirm whether or not the message has arrived at the device 15.

A function for acquiring device status information is included in the broker library 132. This enables the middleware unit 133 to acquire the device status information in real time, that is, to confirm a current status of the device 55.

In the above-described embodiment, programs such as the IoT middleware 131 and the broker library 132 are executed by the CPU, which is a general-purpose processor. Alternatively, a program may be executed by a dedicated processor.

Programs such as the IoT middleware 131 and the broker library 132 may be provided to the communication apparatus 11 while they are stored in a computer-readable storage medium. In this case, for example, the communication apparatus 11 includes a drive for reading data from a storage medium, and acquires a program from the storage medium. Examples of a storage medium include a magnetic disk, an optical disk (CD-ROM, CD-R, DVD-ROM, DVD-R, etc.), a magneto-optical disk (MO, etc.), and a semiconductor memory. The program may be stored in a server on the communication network, and the communication apparatus 11 may download the program from the server.

The present invention is not limited to the above-described embodiments and can be embodied in practice by modifying the structural elements without departing from the gist of the invention. In addition, various inventions may be constituted by appropriately combining a plurality of components disclosed in the first embodiment. For example, some components may be omitted from all the components shown in the embodiments. Furthermore, structural elements over different embodiments may be appropriately combined.

REFERENCE SIGNS LIST

10 . . . Communication system
11 . . . Communication apparatus
12 . . . CPU
13 . . . Memory
14 . . . Communication interface
15 . . . Device
16 . . . Application
131 . . . IoT middleware
132 . . . Broker library
133 . . . Middleware unit
134 . . . Broker
1331 . . . Device control unit
1332 . . . Device status managing unit
1333 . . . Data storage unit
1341 . . . Message forwarding unit
1342 . . . Session managing unit
1343 . . . Responding unit
50 . . . Communication system
51 . . . Middleware unit
52 . . . Broker
55 . . . Device
56 . . . Application
511 . . . Device control unit
512 . . . Device status managing unit
513 . . . Data storage unit
521 . . . Message forwarding unit
522 . . . Session managing unit
523 . . . Responding unit

The invention claimed is:

1. A message transmitting and receiving method performed by a communication apparatus, the communication apparatus comprising a processor and a storage unit configured to store a middleware and a library, the middleware, when executed by the processor, causing the processor to operate as a middleware unit configured to manage a message published by a publisher in a publish/subscribe system in which a message is exchanged between the publisher and a subscriber via a broker, the library including functions configured to provide the broker, the method comprising:
    performing, by the middleware unit, subscribing on the broker by setting a callback function;

upon receipt of a first message published by a first device, passing, by the broker, the first message to the middleware unit by calling the callback function;

transmitting, by the middleware unit, the first message to a second device in response to receipt of the first message from the broker;

when the callback function is called, returning, by the middleware unit, a function in which whether or not predetermined processing including storage of the first message has succeeded is assigned to a return value; and transmitting to the first device information indicating whether or not the first message has arrived at the middleware unit, depending on the function returned by the middleware unit.

2. The message transmitting and receiving method according to claim 1, further comprising:

receiving, by the middleware unit, control information for controlling the first device from a third device; and publishing, by the middleware unit, a second message including the control information with respect to the broker by performing a function call.

3. The message transmitting and receiving method according to claim 2, further comprising returning, by the broker, a function in which whether or not the second message has arrived at the first device is assigned to a return value.

4. The message transmitting and receiving method according to claim 1, further comprising acquiring, by the middleware unit, device status information indicating a status of the first device from the broker by performing a function call.

5. The message transmitting and receiving method according to claim 4, wherein the device status information includes session information indicating a status of connection with the first device or active-and-inactive information indicating an active-and-inactive status of the first device.

6. A non-transitory computer readable medium storing a computer program, the computer program comprising a middleware and a library, the middleware, when executed by a computer, causing the computer to operate as a middleware unit configured to manage a message published by a publisher in a publish/subscribe system in which a message is exchanged between the publisher and a subscriber via a broker, the library including functions configured to provide the broker wherein the computer program is executed by the computer to provide the steps of:

performing, by a middleware unit, subscribing on the broker by setting a callback function;

upon receipt of a first message published by a first device, passing, by the broker, the first message to the middleware unit by calling the callback function;

transmitting, by the middleware unit, the first message to a second device in response to receipt of the first message from the broker;

when the callback function is called, returning, by the middleware unit, a function in which whether or not predetermined processing including storage of the first message has succeeded is assigned to a return value; and transmitting to the first device information indicating whether or not the first message has arrived at the middleware unit, depending on the function returned by the middleware unit.

7. The non-transitory computer readable medium according to claim 6, further comprising: receiving, by the middleware unit, control information for controlling the first device from a third device; and publishing, by the middleware unit, a second message including the control information with respect to the broker by performing a function call.

8. The non-transitory computer readable medium to claim 7 further comprising returning, by the broker, a function in which whether or not the second message has arrived at the first device is assigned to a return value.

9. The non-transitory computer readable medium according to claim 6, further comprising acquiring, by the middleware unit, device status information indicating a status of the first device from the broker by performing a function call.

10. The non-transitory computer readable medium according to claim 9, wherein the device status information includes session information indicating a status of connection with the first device or active-and-inactive information indicating an active-and-inactive status of the first device.

11. A communication apparatus comprising:

a processor;

a memory coupled to the processor, the memory being configured to store a middleware and a library, the middleware, when executed by the processor, causing the processor to operate as a middleware unit configured to manage a message published by a publisher in a publish/subscribe system in which a message is exchanged between the publisher and a subscriber via a broker, the library including functions configured to provide the broker, wherein the middleware unit is further configured to perform subscribing on the broker by setting a callback function, wherein the broker is configured to, upon receipt of a first message published by a first device, pass the first message to the middleware unit by calling the callback function, and wherein the middleware unit is configured to, in response to receipt of the first message from the broker, transmit the first message to a second device, wherein the middleware unit is configured to, when the callback function is called, return a function in which whether or not predetermined processing including storage of the first message has succeeded is assigned to a return value, and wherein the broker is configured to transmit to the first device information indicating whether or not the first message has arrived at the middleware unit, depending on the function returned by the middleware unit.

12. The communication apparatus according to claim 11, wherein the middleware unit is configured to:

receive control information for controlling the first device from a third device; and publish a second message including the control information with respect to the broker by performing a function call.

13. The communication apparatus according to claim 12 wherein the broker is further configured to return a function in which whether or not the second message has arrived at the first device is assigned to a return value.

14. The communication apparatus according to claim 11, wherein the middleware unit is further configured to acquire device status information indicating a status of the first device from the broker by performing a function call.

15. The communication apparatus according to claim 14, wherein the device status information includes session information indicating a status of connection with the first device or active-and-inactive information indicating an active-and-inactive status of the first device.

\* \* \* \* \*